United States Patent [19]

Oyama et al.

[11] Patent Number: 4,643,938

[45] Date of Patent: Feb. 17, 1987

[54] BELT COMPRISING RUBBER AND FIBERS

[75] Inventors: Motofumi Oyama, Yokosuka; Yoichiro Kubo, Yokohama; Toshiharu Honda, Kamakura, all of Japan

[73] Assignee: Nippon Zeon Co., Ltd., Tokyo, Japan

[21] Appl. No.: 526,344

[22] Filed: Aug. 24, 1983

[30] Foreign Application Priority Data

Aug. 27, 1982 [JP] Japan ............................ 57-148656

[51] Int. Cl.$^4$ ................................................. B32B 7/00
[52] U.S. Cl. ..................................... 428/268; 428/283; 428/295; 428/365; 428/462; 428/463; 428/521; 428/522; 524/565; 524/443; 474/263; 474/271
[58] Field of Search .............. 428/224, 256, 260, 265, 428/272, 268, 273, 288, 274, 290, 295, 365, 462, 463, 521, 522; 524/565, 443, 495, 556; 474/263, 271

[56] References Cited

U.S. PATENT DOCUMENTS

| | | | |
|---|---|---|---|
| 3,190,137 | 6/1965 | Adam | 428/260 |
| 3,941,162 | 3/1976 | McCabe et al. | 428/265 |
| 3,963,113 | 6/1976 | Boyer | 428/295 |
| 4,048,865 | 9/1977 | Bell et al. | 428/260 |
| 4,154,335 | 5/1979 | Burnett et al. | 428/295 |
| 4,205,555 | 6/1980 | Long et al. | 428/260 |

*Primary Examiner*—Edith Buffalow
*Attorney, Agent, or Firm*—Sherman and Shalloway

[57] ABSTRACT

A belt comprising a copolymer rubber and fibers and having strong adhesion strength even after heat-aging in air or oil and repeated deformation. The copolymer rubber has in its polymer chain (1) 10 to 60% by weight of units derived from an unsaturated nitrile, (2) 0 to 30% by weight of units derived from a conjugated diene and (3) 10 to 90% by weight of units derived from an ethylenically unsaturated monomer other than unsaturated nitriles and/or units formed by hydrogenating units derived from a conjugated diene.

7 Claims, No Drawings

BELT COMPRISING RUBBER AND FIBERS

This invention relates to a belt composed of a rubber and fibers which retain strong adhesion between the components even after it has been heat-aged in air or oil or repeatedly deformed.

Because of its superior oil resistance, an acrylonitrile/butadiene copolymer rubber (to be sometimes referred to as NBR hereinafter) has been extensively used as automotive rubber materials such as belts. Rubber products such as belt composed of NBR and fibers, however, tend to undergo separation at the adhering surface between NBR and fibers when subjected to repeated stretching and contraction or to the effects of heat and oils during use. Ply separation shortens the service life of such rubber products.

Various proposals have been made for improving the adhesion strength of a composite of a rubber and fibers after deterioration. Most of them, however, relate to a method for treating the fibers. Such a method certainly improves the initial adhesion strength between the rubber and fibers, but no satisfactory improvement in adhesion strength after repeated deformation and heat aging in air or oil can be achieved. It has been desired therefore to develop a novel composite having improved adhesion strength after deterioration.

It is an object of this invention to provide a belt comprising a rubber and fibers which can meet such a desire.

According to this invention, the above object is achieved by a belt comprising a copolymer rubber and fibers, said copolymer rubber having in its polymer chain (1) units derived from an unsaturated nitrile, (2) units derived from a conjugated diene and (3) units derived from an ethylenically unsaturated monomer other than unsaturated nitriles and/or units formed by hydrogenating units derived from conjugated diene.

The copolymer rubber should contain 10 to 60 % by weight of units derived from an unsaturated nitrile in its polymer chain. If the amount of these units is less than 10 % by weight, the copolymer rubber has inferior oil resistance, and if it exceeds 60 % by weight, the copolymer rubber has reduced cold resistance. The preferred amount of these units is 20 to 50 % by weight.

The copolymer rubber contains 0 to 30 % by weight of units derived from a conjugated diene in its polymer chain. If the amount of these units exceeds 30 % by weight, the adhesion durability of the copolymer rubber becomes inferior. The preferred amount of these units is 0 to 20 % by weight, particularly 0 to 10 % by weight.

The copolymer rubber should further contain in its polymer chain units derived from an ethylenically unsaturated monomer other than unsaturated nitriles and/or units formed by hydrogenating units derived from a conjugated diene. If the amount of these units is less than 10 % by weight, the adhesion durability of the copolymer rubber becomes inferior. The preferred amount of these units is 35 to 90 % by weight, particularly 40 to 90 % by weight.

The copolymer rubber used in this invention thus includes a copolymer rubber obtained by partially or completely hydrogenating the conjugated diene units of an unsaturated nitrile/conjugated diene copolymer rubber; a copolymer rubber obtained by partially or completely hydrogenating the conjugated diene units of an unsaturated nitrile/conjugated diene/ethylenically unsaturated monomer copolymer rubber; an unsaturated nitrile/conjugated diene/ethylenically unsaturated monomer copolymer rubber; and an unsaturated nitrile/ethylenically unsaturated monomer copolymer rubber.

Monomers used for the production of the copolymer rubbers used in this invention include, for example, unsaturated nitriles such as acrylonitrile and methacrylonitrile; conjugated dienes such as butadiene, isoprene and 1,3-pentadiene; unsaturated carboxylic acids such as acrylic acid, methacrylic acid, itaconic acid and maleic acid; alkyl esters of unsaturated carboxylic acids such as methyl acrylate, 2-ethylhexyl acrylate and octyl acrylate; alkoxyalkyl acrylates such as methoxyethyl acrylate, ethoxyethyl acrylate and methoxyethoxyethyl acrylate, and other ethylenically unsaturated monomers such as allyl glycidyl ether, vinyl chloroacetate, ethylene, butene-1 and isobutylene. In the production of an unsaturated nitrile/ethylenically unsaturated monomer copolymer rubber, a part of the unsaturated monomer may be replaced by a non-conjugated diene such as vinyl norbornene, dicyclopentadiene and 1,4-hexadiene.

Specific examples of the copolymer rubbers in the present invention are copolymer rubbers obtained by partially or completely hydrogenating a butadiene/acrylonitrile copolymer rubber, an isoprene/acrylonitrile copolymer rubber or a butadiene/isoprene/acrylonitrile copolymer rubber; a butadiene/methyl acrylate/acrylonitrile copolymer rubber; a butadiene/acrylic acid/acrylonitrile copolymer rubber, a copolymer rubber obtained by partially or completely hydrogenating a butadiene/acrylic acid/acrylonitrile copolymer rubber; a butyl acrylate/ethoxyethyl acrylate/vinyl chloroacetate/acrylonitrile copolymer rubber, and a butyl acrylate/ethoxyethyl acrylate/vinyl norbornene/acrylonitrile copolymer rubber.

The fibers used in this invention include natural fibers such as cotton, regenerated fibers such as rayon, synthetic fibers such as nylon, polyester, polyvinyl alcohol and aromatic polyamide fibers, steel fibers, glass fibers, and carbon fibers. These fibers may be used singly or in combination with each other. The fibers are embedded in the copolymer rubber as a tensile member in the form of, for example, a staple, filament, cord, rope, nonwoven fabric or woven fabric. The type and form of the fibers can be properly chosen depending upon the type and end use of the belt.

Desirably, the fibers are subjected to a bonding treatment by usual methods prior to their combination with the rubber.

For example, cotton, rayon or nylon fibers are usually subjected to dip in a mixture (to be referred to as RFL) of an aqueous solution of an initial condensate of resorcinol and formaldehyde (to be referred to as RF) and a rubber latex. The rubber latex is not particularly limited, but is preferably an acrylonitrile/butadiene copolymer latex, an acrylonitrile/butadiene/methacrylic acid copolymer latex, an acrylonitrile/butadiene/acrylic acid copolymer latex, or an acrylonitrile/butadiene/vinylpyridine copolymer latex.

Polyester or aromatic polyamide fibers have inferior adhesion to rubbers because of their molecular structures, and cannot attain sufficient adhesion strength by the above pre-treatment with RFL. Hence, these fibers are first treated with a dip containing at least one of isocyanates, ethylenethioureas and epoxies and heat-treated, and then subjected to the aforesaid RFL treatment.

Generally, it is effective to treat glass fibers with a silane compound such as epoxysilane and aminosilane before they are subjected to the RFL treatment. A silane coupling agent such as aminopropyltriethoxysilane is an especially preferred pre-treating agent.

The belt of this invention is produced by mixing the copolymer rubber (which may further contain another rubber in amounts which do not adversely affect the scope of this invention) with ordinary rubber compounding agents such as fillers, reinforcing agents, vulcanizing agents, plasticizers and antioxidants by ordinary mixers, combining the resulting rubber composition with the pre-treated fibers in accordance with a usual method of belt production, molding the composite into a shape conforming to the purpose for which the final belt product is to be used, and thereafter vulcanizing the molded product.

There is no particular restriction on the structure and type (use) of the belt of this invention, but it is particularly suitable for applications which require oil resistance, heat resistance and ozone resistance as well as durability. Examples of such a belt are power transmission belts such as timing belts used in internal combustion engines or machine tools, conveyor belts for transporting oil shale or oil sand, and other belts which are used in an atmosphere in which they undergo repeated bending and deformation in air or oil at high temperatures.

The following examples specifically illustrate the present invention. All parts in these examples are by weight.

SAMPLE PREPARATION EXAMPLE 1

One hundred parts of each of the rubbers indicated in Table 1 was mixed with 5 parts of zinc oxide, 1 part of stearic acid, 40 parts of FEF carbon black, 0.5 part of sulfur, 2 parts of tetramethylthiuram disulfide, 0.5 part of mercaptobenzothiazole, 1 part of octylated diphenylamine, and 1 part of N-phenyl-N'-isopropyl-p-phenylenediamine to obtain a rubber composition. The composition was molded into a sheet having a thickness of about 3 mm by means of a 6-inch roll. Rectangular test samples, 155 mm long and 25 mm wide, were punched out from the sheet.

Table 1 summarizes the copolymer rubbers used.

TABLE 1

| | Copolymer rubber | | | | | | |
|---|---|---|---|---|---|---|---|
| | Acrylonitrile/butadiene/ hydrogenated butadiene copolymer rubber | | | | | Acrylonitrile/ butadiene butyl acrylate copolymer rubber | |
| Composition | A | B | C | D | E* | F | G |
| Acrylonitrile units (wt. %) | 37 | 37 | 45 | 37 | 33 | 35 | 35 |
| Butadiene units (wt. %) | 18.9 | 6.3 | 5.5 | 34.6 | 67 | 5 | 30 |
| Hydrogenated butadiene units (wt. %) | 44.1 | 56.7 | 49.5 | 28.4 | — | — | — |
| Butyl acrylate units (wt. %) | — | — | — | — | — | 60 | 35 |

*Nipol 1042, a product of Nippon Zeon Co., Ltd.

SAMPLE PREPARATION EXAMPLE 2

Nylon cord (6-nylon; structure 1260D/2), rayon cord (3-Super; structure 1650D/2) and polyester cord (polyethylene terephthalate; structure 1500D/3) were each dipped in an RF/RFL mixture, and heat-treated at 200° C. for 1 minute to prepare cords for tensile members).

SAMPLE PREPARATION EXAMPLE 3

Aramid fibers (Kevler, a tradename of E. I. du Pont de Nemours & Co.; structure 1500D/2, 127T/m) were immersed in a dip having the composition shown in Table 2, then immersed in RFL, and heat-treated at 230° C. for 1 minute to form a cord for a tensile member.

Glass fiber cord (structure ECG 150 3/10 20S) was immersed in a 5 % aqueous dispersion of α-aminopropyltriethoxysilane, heat-treated at 150° C. for 3 minutes, and further heat-treated at 200° C. for 1 minute to obtain a cord for a tensile member.

TABLE 2

| | |
|---|---|
| Diglycidyl ether of glycerol | 2.22 parts |
| 10% Aqueous solution of NaOH | 0.28 parts |
| 5% "AEROSOL" OT (75% solids)** | 0.56 parts |
| Water | 96.94 parts |
| Total | 100.00 |

**A product of Nippon Aerosil Co., Ltd.

EXAMPLE 1

Each of the cords prepared in Sample Preparation Examples 2 and 3 was interposed between two test samples prepared in Sample Preparation Example 1 in such a manner that the lengthwise direction of the cord agreed with the lengthwise direction of the samples) to form a three-layer assembly. The assembly was press-cured at 160° C. for 20 minutes to prepare a belt sample having a width of 25.0 mm, a length of 155 mm and a thickness of 6.35 mm.

To examine the adhesion of the cords to the rubber of each belt sample after heat-aging, it was subjected to an aging test in heated air at 125° C. for 14 days, and then its adhesion strength was measured in accordance with JIS K-6301. The results are shown in Table 3.

TABLE 3

Adhesion strength (Kgf)

$$\left[\frac{\text{Adhesion strength after heat-aging}}{\text{Adhesion strength before heat-aging}}\right]$$

| | Run No. | | | | | | |
|---|---|---|---|---|---|---|---|
| | Invention | | | | Comparison | | |
| | 1 | 2 | 3 | 4 | 5 | 6 | 7 |
| Fibers for tensile member | Copolymer rubber | | | | | | |
| | A | F | B | C | E | D | G |
| Rayon | 16.5/20.5 | 18.5/19.5 | 17.0/19.0 | 18.0/19.0 | 8.0/22.5 | 5.5/24.5 | 9.0/21.5 |
| Nylon | 18.0/19.5 | 16.5/20.0 | 18.5/19.5 | 18.0/18.5 | 7.5/23.5 | 5.0/23.0 | 6.0/22.0 |
| Polyester | 16.5/19.0 | 16.0/18.0 | 17.5/17.5 | 16.0/17.5 | 4.5/19.5 | 2.0/18.0 | 3.0/19.0 |
| Aramid fibers | 20/20.5 | 20/20.0 | 23/22.5 | 21.5/22.0 | 8.5/23.0 | 8.0/21.0 | 5.0/20.5 |
| Glass fibers | 16.5/19.5 | 17.5/18.5 | 18.0/19.5 | 15.0/17.5 | 6.5/17.0 | 5.5/14.0 | 5.0/15.5 |

EXAMPLE 2

Belt test samples prepared in the same way as in Example 1 were subjected to repeated flexing by De Mattia Flexing Machine at room temperature through 10,000 cycles in accordance with JIS K-6301, and then the adhesion strengths of the samples were measured. The results are shown in Table 4.

TABLE 4

Adhesion strength (Kgf)

$$\left[\frac{\text{Adhesion strength after the bending test}}{\text{Adhesion strength before the bending test}}\right]$$

| Fibers for tensile member | Invention | | | | Comparison | | |
|---|---|---|---|---|---|---|---|
| | Run No. | | | | | | |
| | 1 | 2 | 3 | 4 | 5 | 6 | 7 |
| | Copolymer rubber | | | | | | |
| | A | F | B | C | E | D | G |
| Rayon | 19.5/20.5 | 18.0/19.5 | 19.0/19.0 | 18.5/19.0 | 9.5/22.5 | 13.5/24.5 | 11.0/21.5 |
| Nylon | 19.0/19.5 | 17.0/20.0 | 19.0/19.5 | 17.5/18.5 | 10.5/23.5 | 13.0/23.0 | 9.5/22.0 |
| Polyester | 16.5/19.0 | 15.0/18.0 | 13.5/17.5 | 14.5/17.5 | 5.5/19.5 | 5.0/18.5 | 5.5/19.0 |
| Aramid fibers | 17.5/20.5 | 19.0/20.0 | 20.0/22.5 | 21.0/22.0 | 10.0/23.0 | 8.0/21.0 | 7.5/20.5 |
| Glass fibers | 17.5/19.5 | 19.0/18.5 | 17.5/19.5 | 16.0/17.5 | 12.5/17.0 | 6.0/14.0 | 5.0/15.5 |

EXAMPLE 3

Belt test samples prepared in the same way as in Example 1 were subjected to an immersion test in accordance with JIS K-6301. Specifically, they were each immersed in JIS No. 3 oil at 130° C. for 14 days, and then their adhesion strengths were measured. The results are shown in Table 5.

TABLE 5

Adhesion strength (Kgf)

$$\left[\frac{\text{Adhesion strength after immersion in JIS No. 3 oil}}{\text{Adhesion strength before immersion in JIS No. 3 oil}}\right]$$

| Fibers for tensile member | Invention | | | | Comparison | | |
|---|---|---|---|---|---|---|---|
| | Run No. | | | | | | |
| | 1 | 2 | 3 | 4 | 5 | 6 | 7 |
| | Copolymer rubber | | | | | | |
| | A | F | B | C | E | D | G |
| Rayon | 13.5/20.5 | 14.0/19.5 | 15.5/19.0 | 16.0/19.0 | 6.5/22.5 | 3.5/24.5 | 5.0/21.5 |
| Nylon | 13.5/19.5 | 14.0/20.0 | 15.5/19.5 | 17.0/18.5 | 6.5/23.5 | 5.5/23.0 | 6.0/22.0 |
| Polyester | 11.5/19.0 | 12.5/18.0 | 16.5/17.5 | 17.0/17.5 | 4.5/19.5 | 7.5/18.5 | 7.0/19.0 |
| Aramid fibers | 11.5/20.5 | 13.0/20.0 | 16.5/22.5 | 17.5/19.5 | 5.0/23.0 | 4.5/21.0 | 6.5/20.5 |
| Glass fibers | 17.5/19.5 | 16.0/18.5 | 16.5/19.5 | 17.0/17.5 | 6.0/17.0 | 6.0/14.0 | 7.0/15.5 |

The results obtained in the above examples demonstrate that the belts of this invention have much higher adhesion strength between the rubbers and the fibers after mechanical fatigue, heat deterioration and immersion in oil than conventional belts based on NBR.

What is claimed is:

1. A belt comprising a copolymer rubber and fibers, said copolymer rubber having in its polymer chain (1) 10 to 60% by weight of units derived from an unsaturated nitrile, (2) 0 to 30% by weight of units derived from a conjugated diene, and (3) 10 to 90% by weight of units derived from a monoethylenically unsaturated monomer other than unsaturated nitriles and/or units formed by hydrogenating units derived from a conjugated diene.

2. The belt of claim 1 wherein the copolymer rubber has 20 to 50% by weight of the units (1), 0 to 20% by weight of the units (2) and 35 to 90% by weight of the units (3) in its polymer chain.

3. The belt of claim 1 wherein the fibers are natural fibers, regenerated fibers, synthetic fibers, steel fibers, glass fibers or carbon fibers.

4. The belt of claim 1 wherein the fibers are in the form of a staple, filament, cord, rope, nonwoven fabric or woven fabric composed of natural fibers, regenerated fibers, synthetic fibers, steel fibers, glass fibers or carbon fibers.

5. The belt of claim 1 wherein the copolymer rubber is selected from the group consisting of a copolymer rubber obtained by partially or completely hydrogenating the conjugated diene units of an unsaturated nitrile/-conjugated diene copolymer rubber; a copolymer rubber obtained by partially or completely hydrogenating the conjugated diene units of an unsaturated nitrile/conjugated diene/monoethylenically unsaturated monomer copolymer rubber; an unsaturated nitrile/conjugated diene/monoethylenically unsaturated monomer copolymer rubber; and an unsaturated nitrile/monoethylenically unsaturated monomer copolymer rubber.

6. The belt of claim 1 wherein the copolymer rubber is selected from the group consisting of copolymer rubbers obtained by partially or completely hydrogenating a butadiene/acrylonitrile copolymer rubber, an isoprene/acrylonitrile copolymer rubber, a butadiene/isoprene/acrylonitrile copolymer rubber, and a butadiene/acrylic acid/acrylonitrile copolymer rubber.

7. The belt of claim 1 wherein the copolymer rubber is selected from the group consisting of a butadiene/methylacrylate/acrylonitrile copolymer rubber; a butadiene/acrylic acid/acrylonitrile copolymer rubber; a butylacrylate/ethoxyethylacrylate/vinyl chloroacetate/acrylonitrile copolymer rubber; and a butylacrylate/ethoxyethylacrylate/vinyl norbornene-acrylonitrile copolymer rubber.

* * * * *